(12) United States Patent
Necovski et al.

(10) Patent No.: US 10,595,177 B1
(45) Date of Patent: Mar. 17, 2020

(54) CAREGIVER HANDSHAKE SYSTEM IN A VEHICLE

(71) Applicant: DENSO International America, Inc., Southfield, MI (US)

(72) Inventors: Jordan Necovski, Livonia, MI (US); Yu Zhang, Farmington Hills, MI (US); Bilal Alasry, Dearborn, MI (US); Te-Ping Kang, Ann Arbor, MI (US); Vikas Upmanue, Novi, MI (US); Sean Bleicher, Fenton, MI (US); Doua Vang, Waterford, MI (US); Eleanor Duke, Sterling Heights, MI (US); Nicholaus Spunar, Canton, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 0 days.

(21) Appl. No.: 16/364,943

(22) Filed: Mar. 26, 2019

(51) Int. Cl.
*H04W 4/44* (2018.01)
(52) U.S. Cl.
CPC .................................... *H04W 4/44* (2018.02)
(58) Field of Classification Search
CPC ........................................................ H04W 4/44
USPC ..................................................... 455/414.1
See application file for complete search history.

(56) References Cited

U.S. PATENT DOCUMENTS

| | | | |
|---|---|---|---|
| 9,171,268 B1 | 10/2015 | Penilla et al. | |
| 9,177,429 B2 | 11/2015 | Lawrenson | |
| 2012/0280813 A1* | 11/2012 | Ahluwalia | H04W 8/18 340/540 |
| 2014/0306814 A1* | 10/2014 | Ricci | H04W 4/21 340/425.5 |
| 2014/0310788 A1* | 10/2014 | Ricci | G06F 16/583 726/6 |
| 2015/0094544 A1* | 4/2015 | Spolin | A61B 5/7275 600/301 |
| 2015/0120135 A1* | 4/2015 | Lawrenson | B60W 50/085 701/36 |
| 2016/0249853 A1 | 9/2016 | Ricci | |

* cited by examiner

*Primary Examiner* — William Nealon
(74) *Attorney, Agent, or Firm* — Brooks Kushman P.C.

(57) ABSTRACT

A system in a vehicle including a primary caregiver vehicle device of a primary caregiver providing care to a companion. The primary caregiver vehicle device includes a wireless transceiver in communication with a secondary caregiver device of a secondary caregiver. The primary caregiver device includes a controller in communication with the wireless transceiver. The controller is configured to receive a request to transmit a companion profile of the companion to the secondary caregiver device. The companion profile includes data changing over time in response to data received from the primary caregiver vehicle device and the secondary caregiver device. The controller is further configured to transmit the companion profile from the primary caregiver vehicle device to the secondary caregiver device in response to the request to transmit the companion profile.

20 Claims, 4 Drawing Sheets

CAREGIVER HANDSHAKE SYSTEM IN A VEHICLE

TECHNICAL FIELD

The present disclosure relates to a caregiver handshake system in a vehicle that may include a secure transfer of a companion profile associated with the caregiver within a vehicle environment.

BACKGROUND

Transferring responsibility of a companion from one caregiver to another caregiver may be a cumbersome task, especially in a vehicle environment. A parent may leave a child with a babysitter for purposes of transporting a child to his/her daily activities while the parent is at work. The babysitter may find this process cumbersome if the caregiver is not familiar with the child's daily routine.

SUMMARY

According to one embodiment, a system in a vehicle including a primary caregiver vehicle device of a primary caregiver providing care to a companion is disclosed. The primary caregiver vehicle includes a wireless transceiver in communication with a secondary caregiver device of a secondary caregiver. The primary caregiver device includes a controller in communication with the wireless transceiver. The controller is configured to receive a request to transmit a companion profile of the companion to the secondary caregiver device. The companion profile includes data changing over time in response to data received from the primary caregiver vehicle device and the secondary caregiver device. The controller is further configured to transmit the companion profile from the primary caregiver vehicle device to the secondary caregiver device in response to the request to transmit the companion profile.

According to another embodiment, a system in a vehicle including a primary caregiver vehicle device of a primary caregiver providing care to a companion is disclosed. The primary caregiver vehicle device includes a wireless transceiver in communication with a secondary caregiver device of a secondary caregiver. The primary caregiver device includes a controller in communication with the wireless transceiver. The controller is configured to store a companion profile of the companion with a read access and a write access. The controller is further configured to receive a request to transfer control of a companion profile of the companion to the secondary caregiver device. The controller is also configured to disable the write and/or read access of the companion profile. The controller is also configured to transmit the companion profile from the primary caregiver vehicle device to the secondary caregiver device in response to the request to transfer control the companion profile.

According to another embodiment, a system in a vehicle including a secondary caregiver vehicle device of a secondary caregiver providing care to a companion is disclosed. The secondary caregiver vehicle device includes a wireless transceiver in communication with a primary caregiver device of a primary caregiver. The secondary caregiver device includes a controller in communication with the wireless transceiver. The secondary caregiver device is configured to store companion biometric data of the companion, obtain occupant biometric data of one or more vehicle occupants, compare the occupant biometric data with the companion biometric data to determine a companion occupant condition, and receive a companion profile in response to the companion occupant condition.

DETAILED DESCRIPTION

Figure 1:
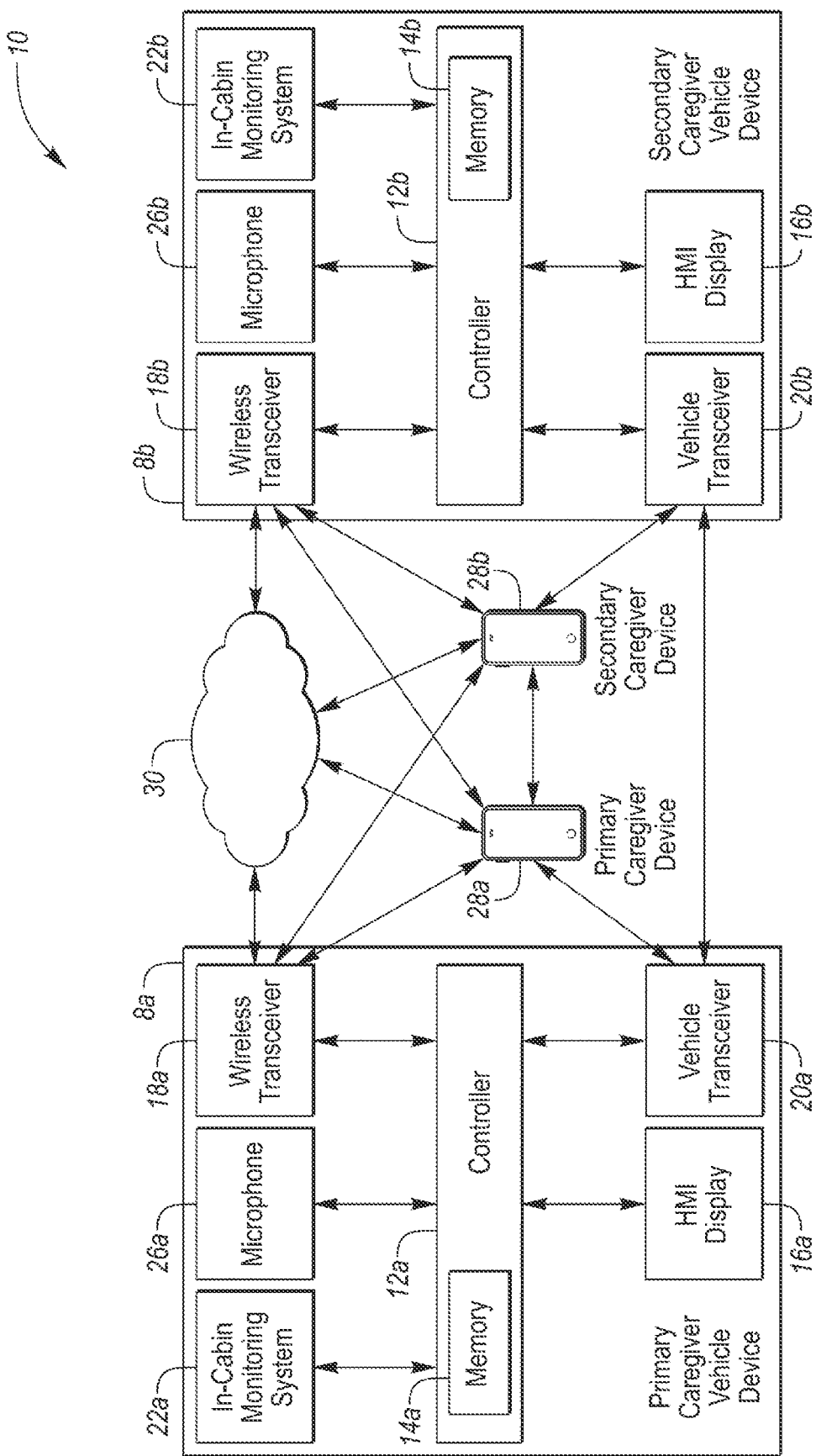
FIG. 1 illustrates an architecture of a vehicle system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An in-vehicle electronic system of accomplishing a smooth caretaker handoff so that the current caretaker can meet the companion's needs is desired. What is needed is an in-vehicle caregiver handshake system in which a companion profile is dynamically updated by caregiver inputs from caregiver devices. Existing proposals fall short of addressing this need as well as other needs.

One proposal is directed to an in-vehicle infant health monitoring system. The proposal includes an infant monitor/prediction module that can inform users of various statistics relating to an infant passenger. While this information can be passed to a user's home and shared with more than one user, the information is not updated from inputs from caregiver devices.

Another proposal is directed to a method and apparatus for assigning profile data to one or more vehicle sub-systems of a vehicle. The apparatus determines a role of an identified occupant in a vehicle and associates the determined role of the identified occupant to the profile data of the identified occupant. This proposal does not provide an in-vehicle caregiver handshake system in which a companion profile is dynamically updated by caregiver inputs from caregiver devices.

In yet another proposal, a system is disclosed in which user profiles can be set and transferred to vehicles. The system includes the capability of temporary sharing of user profiles to shared-use vehicles. This system also has the capability of identifying a user and automatic retrieval of a user profile from cloud services. The proposal also does not provide an in-vehicle caregiver handshake system in which a companion profile is dynamically updated by caregiver inputs from caregiver devices.

In embodiments herein, an in-vehicle system is disclosed in which a companion profile is dynamically updated by caregiver inputs from caregiver devices. These systems have the benefit of seamless electronic transition from one caregiver to the next, thereby reducing stress for the caregivers and companion.

FIG. 1 illustrates an architecture of vehicle system 10 according to an embodiment. Vehicle system 10 includes primary caregiver vehicle device 8a and secondary caregiver vehicle device 8b. Primary and secondary caregiver vehicle devices 8a and 8b include controllers 12a and 12b, respectively. Controllers 12a and 12b may each be a vehicle controller such as an electronic control unit (ECU). Controllers 12a and 12b may each be embodied in a processor configured to carry out instructions for the methods and systems described herein. Controllers 12a and 12b may include memories 14a and 14b, respectively, and other components specific to processing commands and data within a vehicle. Controllers 12a and 12b may each be one or more computing devices such as a quad core processor for processing commands, such as a computer processor, microprocessor, or any other device, series of devices or other mechanisms capable of performing the operations discussed herein. Memories 14a and 14b may each store instructions and commands. The instructions may be in the form of software, firmware, computer code, or some combination thereof. Memories 14a and 14b may be in the form of one or more data storage devices, such as volatile memory, non-volatile memory, electronic memory, magnetic memory, optical memory, or any other form of data storage device. In one example, memory may include 2 GB DDR3, as well as other removable memory components such as a 128 GB micro SD card.

Controllers 12a and 12b may each be in communication with various sensors, modules, vehicle systems, sub-systems both within and remote of a vehicle. As shown in FIG. 1, primary and secondary caregiver vehicle devices 8a and 8b includes human machine interface (HMI) displays 16a and 16b, respectively, wireless transceivers 18a and 18b, respectively, vehicle transceivers 20a and 20b, respectively, in-cabin monitoring systems 22a and 22b, respectively and microphones 26a and 26b, respectively. Primary and secondary caregiver vehicle devices 8a and 8b of FIG. 1 are example vehicles, and other vehicles may include more or less sensors in specific locations for purposes of illustration. A vehicle may be equipped with additional sensors at different locations within or on the vehicle, including additional sensors of the same or different type. As described below, these sensors may be used to carry out functions or features of an in-vehicle caregiver handshake system.

As set forth above, primary and secondary caregiver vehicle devices 8a and 8b are equipped with wireless transceivers 18a and 18b, respectively. Wireless transceivers 18a and 18b are each configured to communicate (i.e., transmit and receive data and signals) with one or more user mobile devices, such as primary caregiver user device 28a and secondary caregiver user device 28b. Non-limiting examples of user mobile devices include cell phones, smart phones, personal digital assistants (PDAs), tablets, or any other portable digital device having wireless remote network connectivity. The user mobile device may be configured to communicate with external network 30 outside of primary and secondary caregiver vehicle devices 8a and 8b through, for example, communication with a cellular tower (e.g., a WiFi access point). The user mobile device may be configured to record the user's interactions with the user mobile device. Non-limiting examples of such interactions include web browsing and texting. Wireless transceivers 18a and 18b may each be a BLUETOOTH transceiver.

If a user has a data plan connected to the user mobile device, the data plan may permit broadband transmission. Wireless transceivers 18a and 18b may each use such broadband transmission capability to increase the speed of data transfer over a relatively wider bandwidth. In another embodiment, the user mobile device is replaced with a wireless local are network (LAN) device capable of communication over external network 30, for example and without limitation, an 802.11g network, e.g. WiFi or a WiMax network. In one embodiment, incoming data can be passed through the user mobile device via a data-over-voice or data plan, through an onboard BLUETOOTH transceiver and into controllers 12a or 12b. In case of certain temporary data, for example, the data can be stored on a hard disk drive (HDD) or other storage medium until such time as the data is no longer needed.

In another embodiment, wireless transceivers 18a and 18b may each be an on-board communication device or cellular modem. The on-board communication device may not require a cellular phone (e.g., user mobile device) to be paired with a BLUETOOTH transceiver to communicate to an off-board server. Instead, the on-board modem may have its own capability to communicate with an off-board network.

Primary and secondary caregiver vehicle devices 8a and 8b may include vehicle transceivers 20a and 20b, respectively, each configured to transmit and receive signals and data from transceivers, transmitters and/or objects proximate to primary and secondary caregiver vehicle devices 8a and 8b, respectively. Vehicle transceivers 20a and 20b may each be a vehicle-to-vehicle (V2V) or vehicle-to-infrastructure (e.g., V2X). In one embodiment, primary and secondary caregiver vehicle devices 8a and 8b may communicate between vehicle transceivers 20a and 20b. Vehicle transceivers 20a and 20b may each be utilized to transmit and/or receive data between primary and secondary caregiver user device 28a and 28b.

Primary and secondary caregiver vehicle device 8a and 8b may include in-cabin monitoring systems 22a and 22b, respectively, each configured to monitor a status of a driver and/or passenger (collectively vehicle occupants). In-cabin monitoring systems 22a and 22b may each include a driver status monitoring system (DSM) and a passenger monitoring system (PSM). The vehicle driver may be the primary caregiver (e.g., parent, mom, dad, etc.) in connection with primary caregiver vehicle device 8a. A passenger of primary caregiver vehicle device 8a may be a companion (e.g., a child or other individual requiring care). In-cabin monitoring systems 22a and 22b may each be configured to obtain video data of a driver or passenger (e.g., facial information, eye movement or head movement). The video data, including facial data, of the driver and/or passenger can be stored in a companion profile, as discussed herein. In-cabin monitoring systems 22a and 22b may each include in-vehicle cameras, which may be utilized to capture images of a passenger or the driver in the vehicle. The in-vehicle camera may be a color camera, infrared camera, or time of flight camera, for example. The in-vehicle camera may be a driver-facing camera configured to identify a driver or passenger and to provide video input to HMI displays 16a and 16b for various purposes (e.g., video conferencing).

Primary and secondary caregiver vehicle devices 8a and 8b may include microphones 26a and 26b, respectively, each configured to receive input from spoken words from a driver or passengers of primary and secondary caregiver vehicles 8a and 8b, respectively. The spoken words may be converted into voice data and utilize the voice data for voice recognition commands that are determined by a voice recognition engine stored in memories 14a and 14b. Additionally, the voice recognition engine may utilize the spoken words to determine fluctuations or changes in voice pitch to identify mood. For example, the voice recognition engine may be programmed to pick up various fluctuations in the tone of voice, certain commands or sayings from a driver or passenger, or other changes and/or characteristics in spoken words to determine if a mood of a driver or passenger has changed. The voice data of the driver and/or passenger can be stored in a companion profile, as discussed herein.

Primary and secondary caregiver vehicle devices 8a and 8b also includes human-machine interface (HMI) displays 16a and 16b, respectively. HMI displays 16a and 16b may each include any type of display within a vehicle cabin. HMI displays 16a and 16b may each include a dashboard display, navigation display, multimedia display, heads-up display, or thin-film transistor liquid-crystal display (TFT LCD). HMI displays 16a and 16b may each also be connected to speakers to output sound related to commands or user interface of primary and secondary caregiver vehicle devices 8a and 8b, respectively. HMI displays 16a and 16b may each be configured to output various commands or information to occupants (e.g., drivers and passengers) within primary and secondary caregiver vehicle devices 8a and 8b, respectively. HMI displays 16a and 16b may each utilize any type of monitor or display configured to display relevant information to one or more vehicle occupants. HMI displays 16a and 16b may each also include a heads-up display ("HUD") that is utilized to display an interface and other objects on a windshield so that the images are within a driver's periphery while driving. In addition to displaying visual indications, HMI displays 16a and 16b may each be configured to receive user commands indicative of various vehicle controls such as audio-visual controls, autonomous vehicle system controls, certain vehicle features, and cabin temperature control. Controllers 12a and 12b may each be configured to receive such user input and command a relevant vehicle system of a component to perform in accordance with the user input.

Figure 2:
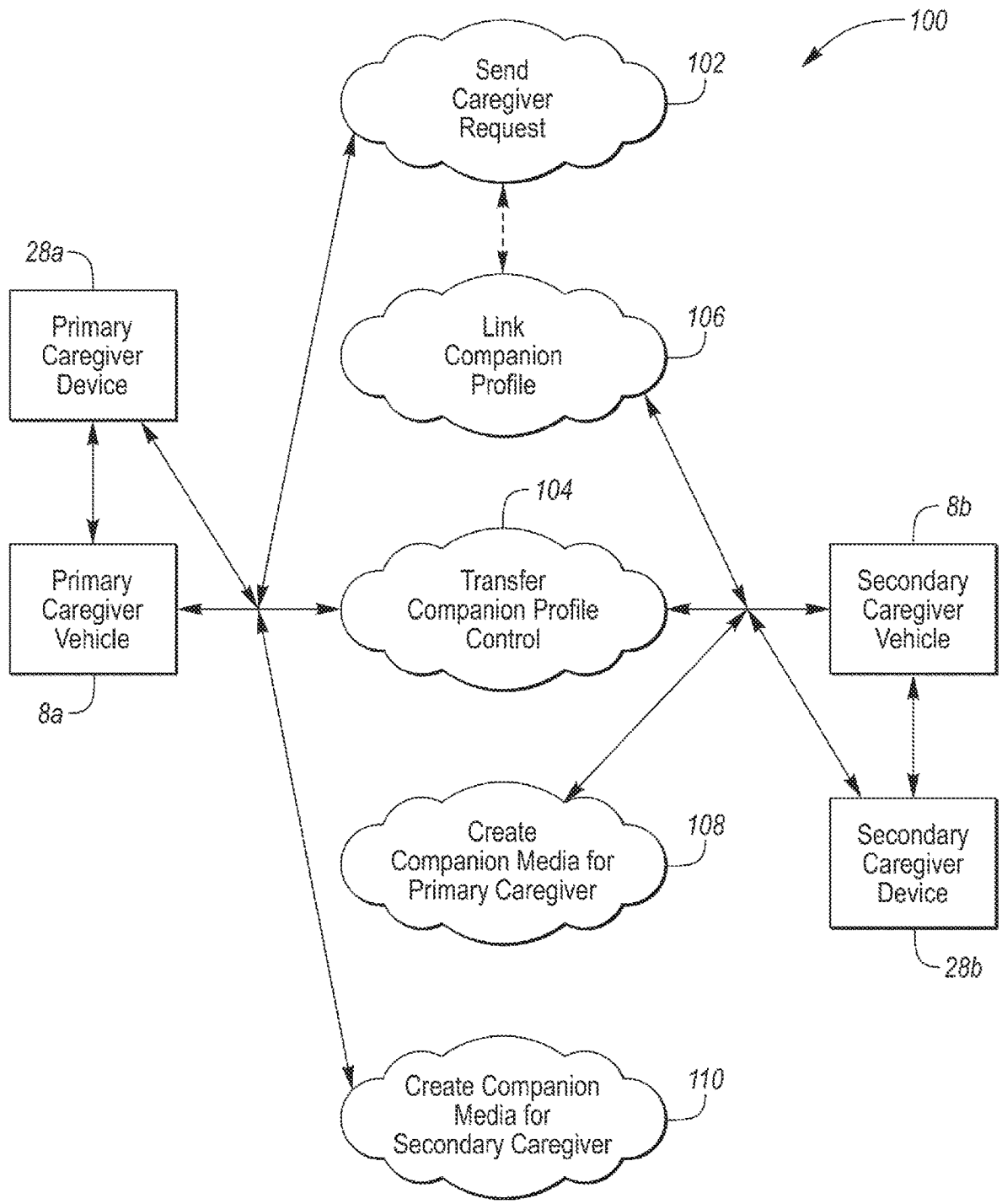
FIG. 2 illustrates an environment of a vehicle system according to an embodiment.

FIG. 2 illustrates an environment of vehicle system 100 according to an embodiment. Vehicle system 100 includes primary caregiver vehicle device 8a, primary caregiver user device 28a, secondary caregiver vehicle device 8b and secondary caregiver user device 28b. Primary caregiver vehicle device 8a and primary caregiver user device 28a may be referred to collectively or independently as a primary caregiver device. Secondary caregiver vehicle device 8b and secondary caregiver user device 28b may be referred to collectively or independently as a secondary caregiver device. Vehicle system 100 includes bubbles 102, 104, 106, 108 and 110 depicting sending, receiving and/or processing data and executing other functions associated with embodiments. These functions may be carried out by a primary caregiver device and a secondary caregiver device. For example, either primary caregiver vehicle device 8a or primary caregiver user device 28a may be configured to execute a function by sending data to either secondary caregiver vehicle device 8b or secondary caregiver user device 28b. In another example, either secondary caregiver vehicle device 8b and secondary caregiver user device 28b may be configured to execute a function by sending data to either primary caregiver vehicle device 8a or primary caregiver user device 28a.

The primary caregiver may be, without limitation, a parent, mom or dad of a companion. The companion may be a child, minor or other individual requiring assistance, aid or companionship. The secondary caregiver may be, without limitation, a babysitter, grandparent, grandpa, grandma, other relative of the companion.

Vehicle system 100 may be configured to send a caregiver request from a primary caregiver device to a secondary caregiver device, as shown in bubble 102. A primary caregiver device may be configured to send a caregiver request to a secondary caregiver device. The caregiver request may include circumstances regarding the request (e.g., duration of responsibility for a secondary caregiver) and a request to provide a response to the request (e.g., a request for a "yes" or "no"). The primary caregiver device is configured to receive a response to the caregiver request from the secondary caregiver device.

As shown in bubble 104, vehicle system 100 may be configured to transfer control of a companion profile from a primary caregiver device to a secondary caregiver device if the response to the caregiver request from the secondary caregiver device is "yes." The companion profile may include companion data associated with a companion and stored in memory (e.g., memory 14a of primary caregiver vehicle device 8a or memory of primary caregiver user device 28a). In one embodiment, the companion may be a child, and the companion profile may include companion data associated with the child. Non-limiting examples of companion data for a child includes the child's in-vehicle preferences (e.g., seating preferences, climate preferences, music preferences, ambient lighting preferences, etc.), scheduled events (e.g., playdates, school events, sports events, activities, doctor's appointments, etc.), and/or checklist(s) (e.g., dietary preferences, behavioral issues, etc.). Primary caregiver device is configured to transfer control of a companion profile from the primary caregiver device to the secondary caregiver device. The transfer of control may include securely transferring the data in the companion profile to a secondary caregiver device.

In one embodiment, when a primary caregiver device has control over a companion profile, a controller associated with the primary caregiver device (e.g., controller 12a of primary caregiver vehicle device 8a or a controller of primary caregiver user device 28a) is configured to permit read and write access to the companion profile stored in the memory of the primary caregiver device. The write access allows the primary caregiver device to update the companion profile with updated data (e.g., removal or additional of scheduled events). In one embodiment, when the primary caregiver device relinquishes control over the companion profile to a secondary caregiver device, the controller of the primary caregiver device is configured to permit read only access to the companion profile stored in the memory of primary caregiver device, and the controller of the secondary caregiver device is configured to permit read and write access to the companion profile stored in memory of the secondary caregiver device. The read only access of controller of the primary caregiver device enforces control of the secondary caregiver device over the companion profile, and only allows updates to the companion profile when controller receives instructions from the secondary caregiver device to update the companion profile. The write access of the controller of the secondary caregiver device allows the secondary caregiver device to update the companion profile with updated data (e.g., removal or additional of scheduled events) when the secondary caregiver device has control over the companion profile. In certain embodiments, the data from the companion profile stored in primary or secondary caregiver vehicle device 8a and 8b may be synched with the data stored on primary and secondary caregiver devices 28a and 28b, respectively. A primary caregiver device may be configured to withdraw control of the companion profile from a secondary caregiver device without permission from a secondary caregiver device. A secondary caregiver device may be configured to transfer control of the companion profile to a primary caregiver device based on a command from the secondary caregiver device.

Vehicle system 100 may be configured to link a companion profile with a caregiver profile of a primary or secondary caregiver device, as shown in bubble 106. The linking configuration may be activated when a caregiver device has control over a companion profile and may be deactivated when a caregiver device does not have control (e.g., has transferred control or has not been given control) over the companion profile. For instance, if a secondary caregiver device has control over the companion profile, then the companion profile can be linked to a secondary caregiver profile. The linking may automatically update the secondary caregiver profile with updates of the companion profile (e.g., removal or additional of scheduled events). The companion profile may be linked to a caregiver profile so that the caregiver can anticipate a child's needs and be familiar with a child's daily routine. The caregiver profile may include caregiver data associated with a caregiver and stored in memory (e.g., memory 14a of primary caregiver vehicle 8a or memory of primary caregiver device 28a for the primary caregiver profile). The caregiver profile may include a calendar for a caregiver.

Vehicle system 100 may be configured to create companion media for a primary caregiver device, as shown in bubble 108. The companion media may be a highlight reel for the companion while the secondary caregiver device has control over the companion profile. The companion media may be generated using the video data collected by in-cabin monitoring system 22a and/or audio data collected by microphone 26a. The companion media may be companion data stored in the companion profile. Because the audio and video data may include audio and video data of the secondary caregiver device and the companion, the companion media may include interesting moments and good interactions between the secondary caregiver and the companion, e.g., child.

Vehicle system 100 may also be configured to create companion media for a secondary caregiver device, as shown in bubble 110. The companion media may be a highlight reel for the companion while the primary caregiver has control over the companion profile. The companion media may be generated using the video data collected by in-cabin monitoring system 22b and/or audio date collected by microphone 26b. The companion media may be companion data stored in the companion profile. Because the audio and video data may include audio and video data of the secondary caregiver device and the companion, the companion media may include interesting moments and good interactions between the primary caregiver device and the companion, e.g., child. This configuration of vehicle system 100 may also be used for a first primary caregiver device (e.g., the device of a mom or dad) to share companion media with a second primary caregiver device (e.g., the device of the other of a mom or dad). In certain embodiments, the companion profile may be synched in the vehicle devices of the first and second primary caregivers.

Figure 3:
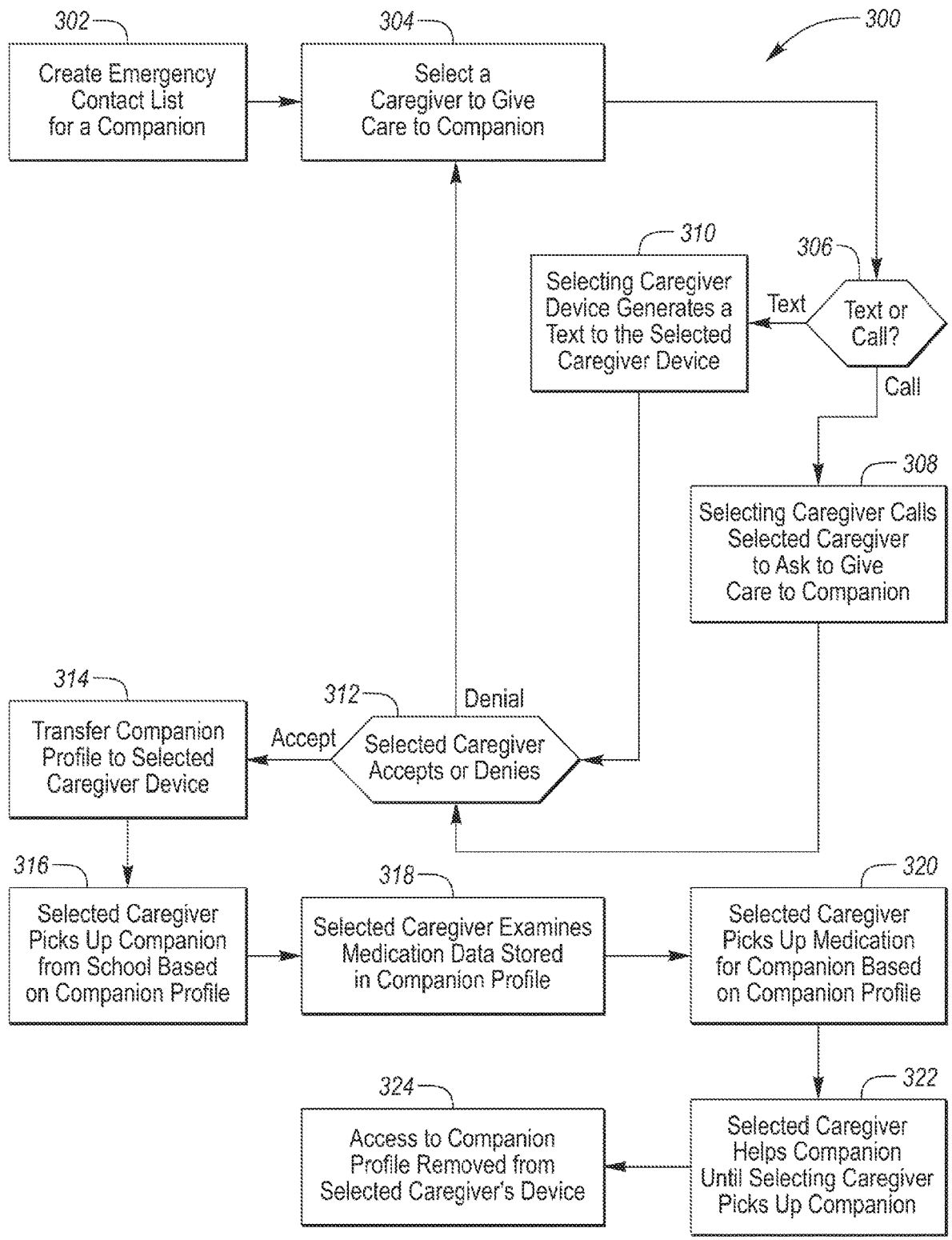
FIG. 3 is a flowchart of a caregiver handshake method according to an embodiment.

FIG. 3 is a flowchart of caregiver handshake method 300 according to an embodiment. The method may be carried out at least partially or entirely in a vehicle environment. For example, at least one of primary caregiver vehicle device 8a and secondary caregiver vehicle device 8b may be configured to send, receive or transmit data and to execute other functions. Also, other caregiver devices may be utilized as part of the caregiver handshake method. These devices may include primary caregiver user device 28a and/or secondary caregiver user device 28b.

At step 302 of caregiver handshake method 300, an emergency contact list for a companion is created. The emergency contact list may be created by a primary caregiver device (e.g., primary caregiver vehicle device 8a or primary caregiver user device 28a). The emergency contact list may be created by another device and imported or sent to the primary caregiver device. In one embodiment, the primary caregiver device is associated with a mom or dad and the companion is a child of the mom and dad.

At step 304 of caregiver handshake method 300, a caregiver is selected to give care to a companion. The selection may be made of a secondary caregiver via a primary caregiver device that sends the selection to a secondary caregiver device associated with the secondary caregiver. In another embodiment, the selection may be made of a second primary caregiver via a first primary caregiver device that sends the selection to a secondary caregiver device associated with the secondary caregiver. The care given to the companion may be care given to a sick child.

In decision box 306 of caregiver handshake method 300, a selection of how to notify the caregiver (e.g., a secondary caregiver or a second primary caregiver) of the selection in 304 is made. The selection may be notification by user device text or call. If the selecting caregiver selects a call, then the selecting caregiver device initiates a call with a selected caregiver device to ask the selected caregiver to give care to the companion, as set forth in step 308. If the selecting caregiver selects a text, then the selecting caregiver device generates a text to the selected caregiver device based on data in the emergency contact list, as set forth in step 308.

In decision box 312 of caregiver handshake method 300, the selected caregiver inputs an acceptance or denial of care for the companion through the selected caregiver device. If the selected caregiver device denies the request to give care to the companion, then vehicle handshake system loops to step 304 to select a new selected caregiver to request care for the companion. If the selected caregiver device accepts the request, then caregiver handshake method 300 transfers the companion profile to selected caregiver, as set forth in step 314. The transfer of the companion profile may be carried out as set forth above in FIG. 2. The selected caregiver may be a second primary caregiver or a secondary caregiver.

At step 316 of caregiver handshake method 300, the selected caregiver picks up the companion (e.g., a sick child) from the companion's school based on the transferred companion profile. The transferred companion profile may be accessible from a selected caregiver device (e.g., a selected caregiver vehicle device). Using the selected caregiver vehicle device is a benefit because the selected caregiver would be in the vehicle when determining the destination of where to pick up the companion.

At step 318 of caregiver handshake method 300, the selected caregiver examines historical medication data stored in the companion profile. The transferred companion profile may be accessible from a selected caregiver device (e.g., a selected caregiver vehicle device). Using the selected caregiver vehicle device is a benefit because the selected caregiver would be in the vehicle on the way to the pharmacy when determining the medications that the companion (e.g., sick child) may need.

At step 320 of caregiver handshake method 300, the selected caregiver picks up medication for the companion based on the companion profile. The pharmacy in which the medication is picked up may be information stored within the companion profile. The companion profile may include other information regarding the pharmacy, such as address information.

At step 322 of caregiver handshake method 300, the selected caregiver keeps the companion until the selecting caregiver picks up the companion. At step 324 of caregiver handshake method 300, access to companion profile is removed from selected caregiver device. This removal may be done automatically based on an electronic trigger or handshake. For example, the selecting caregiver device (e.g., primary caregiver vehicle device 8a) may be proximate to the selected caregiver device (e.g., secondary caregiver vehicle device 8b) such that vehicles transceivers 20a and 20b are in range of each other and send each other handshake signals. Once these handshake signals are sent and certain status information is verified (i.e., the selected caregiver has access to the companion profile), then access to the companion profile by the selected caregiver device may be automatically removed. In another embodiment, if the handshake messages are sent by the two devices, the selecting caregiver device may prompt to confirm that access should be removed and control to the companion profile should be transferred.

Figure 4:
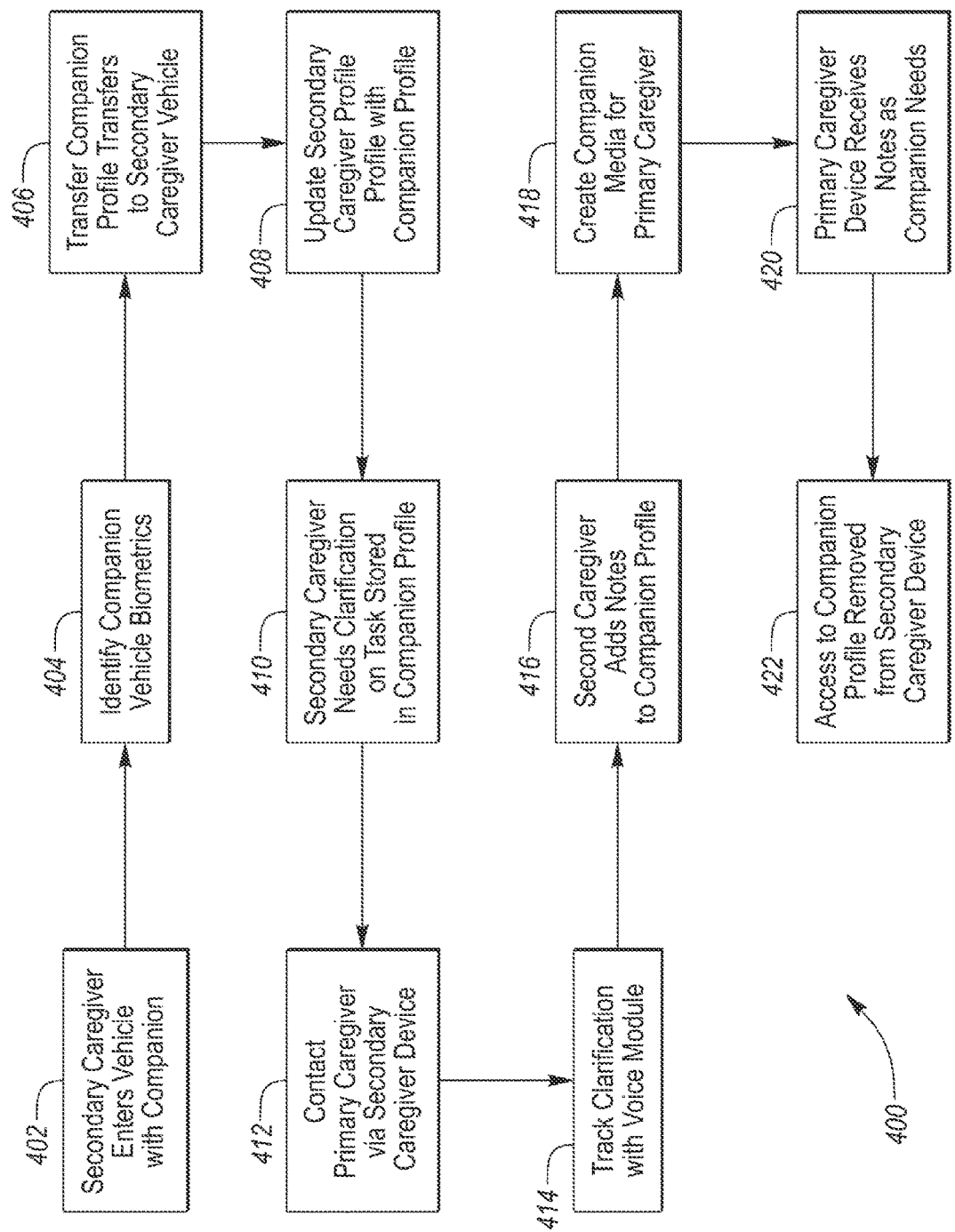
FIG. 4 is a flowchart of a caregiver handshake method according to an embodiment.

FIG. 4 is a flowchart of caregiver handshake method 400 according to an embodiment. The method may be carried out at least partially or entirely in a vehicle environment. For example, at least one of primary caregiver vehicle device 8a and secondary caregiver vehicle device 8b may be configured to send, receive or transmit data and to execute other functions. Also, other caregiver devices may be utilized as part of the caregiver handshake method. These devices may include primary caregiver user device 28a and/or secondary caregiver user device 28b.

At step 402 of caregiver handshake method 400, a secondary caregiver enters a vehicle with a companion. The companion may be a child. The secondary caregiver may be a babysitter or relative of the child. The vehicle may be secondary caregiver vehicle device 8b. The secondary caregiver may bring secondary caregiver device user device 28b into the vehicle.

At step 404 of caregiver handshake method 400, the companion is identified with vehicle biometrics. The vehicle biometrics may include determining the companion identity from video data collected by in-cabin monitoring system 22b and/or audio data collected by microphone 26b. The vehicle biometrics may be carried out by a secondary caregiver device. In certain embodiments, this identification is performed automatically and does not require any input into secondary caregiver vehicle device 8b or secondary caregiver device user device 28b.

At step 406 of caregiver handshake method 400, the companion profile is transferred to a secondary caregiver device. The companion profile may be transferred to the secondary caregiver device from a primary caregiver device. In one embodiment, the secondary caregiver device is secondary caregiver vehicle device 8b and the primary caregiver device is primary caregiver vehicle device 8a, and the transfer is completed automatically when vehicle transceivers 18a and 18b are in proximity to each other.

At step 408 of caregiver handshake method 400, the secondary caregiver profile is updated with the companion profile. As set forth above, this step may encompass linking the companion profile and the secondary caregiver profile. This step may be carried out by secondary caregiver device, e.g., secondary caregiver vehicle device 8b.

At step 410 of caregiver handshake method 400, the secondary caregiver may need clarification on a task stored in the companion profile. At step 412 of caregiver handshake method 400, the primary caregiver is contacted via the secondary caregiver device. In one embodiment, the secondary caregiver device is secondary caregiver vehicle device 8b and the secondary caregiver may give a voice command requesting connection with a primary caregiver device. This voice command is recorded by microphone 26b and transcribed by a voice module in controller 12b. The voice module in controller 12b is configured to initiate contact with the primary caregiver device. In one embodiment, the transcription data is only temporary stored in memory 14b.

At step 414 of caregiver handshake method 400, the clarification is tracked by the voice module. The tracking may include adding a task description to the companion profile. The task description can be added to the companion profile by the voice module.

At step 416 of caregiver handshake method 400, notes are added to the companion profile via secondary caregiver device. In one embodiment, the secondary caregiver device is secondary caregiver vehicle device 8b and the secondary caregiver may give a voice commands recorded by microphone 26b and transcribed by a voice module in controller 12b to be added to the companion profile. The notes may include activities and experiences during the time in which the secondary caregiver is giving care to the companion.

At step 418 of caregiver handshake method 400, companion media is created for the primary caregiver. The companion media may be a highlight reel for the companion while the secondary caregiver device has control over the companion profile. The companion media may be generated using the video data collected by in-cabin monitoring system 22b and/or audio data collected by microphone 26b. The companion media may be companion data stored in the companion profile. Because the audio and video data may include audio and video data of the secondary caregiver device and the companion, the companion media may include interesting moments and good interactions between the secondary caregiver and the companion, e.g., child.

At step 420 of caregiver handshake method 400, the primary caregiver device receives notes and/or companion media. These items may be received through an external network. Alternatively, the secondary caregiver device is secondary caregiver vehicle device 8b and the primary caregiver device is primary caregiver vehicle device 8a, and the transfer is completed automatically when vehicle transceivers 18a and 18b are in proximity to each other.

At step 422 of caregiver handshake method 400, access to the companion profile (now updated with the notes and/or companion media) is removed from the secondary caregiver and given to the primary caregiver device. This removal may be done automatically based on an electronic trigger or handshake. For example, the selecting caregiver device (e.g., primary caregiver vehicle device 8a) may be proximate to the selected caregiver device (e.g., secondary caregiver vehicle device 8b) such that vehicles transceivers 20a and 20b are in range of each other and send each other handshake signals. Once these handshake signals are sent and certain status information is verified (i.e., the selected caregiver has access to the companion profile), then access to the companion profile by the selected caregiver device may be automatically removed. In another embodiment, if the handshake messages are sent by the two devices, the selecting caregiver device may prompt to confirm that access should be removed and control to the companion profile should be transferred.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system in a vehicle, comprising:
   a secondary caregiver vehicle device of a secondary caregiver providing care to a companion,
   the secondary caregiver vehicle device including a wireless transceiver in communication with a primary caregiver device of a primary caregiver, and
   the secondary caregiver vehicle device including a controller in communication with the wireless transceiver and configured to:
   store companion biometric data of the companion;
   obtain occupant biometric data of one or more vehicle occupants;
   compare the occupant biometric data with the companion biometric data to determine a companion occupant condition; and
   receive a companion profile in response to the companion occupant condition.

2. The system of claim 1, wherein the controller is further configured to store the companion profile with a read access and a write access.

3. The system of claim 1, wherein the controller is further configured to link the companion profile to a profile of the secondary caregiver.

4. The system of claim 1, wherein the secondary caregiver vehicle device includes an in-cabin monitoring system configured to obtain video data forming part of the occupant biometric data.

5. The system of claim 1, wherein the secondary caregiver vehicle device includes a microphone configured to obtain audio data forming part of the occupant biometric data.

6. The system of claim 1, wherein the controller is further configured to transmit a request for the companion profile in response to the companion occupant condition.

7. The system of claim 1, wherein the controller is further configured to update the companion profile to a profile of the secondary caregiver.

8. The system of claim 1, wherein the controller is further configured to initiate contact with the primary caregiver device.

9. The system of claim 8, wherein the controller is further configured to request a clarification from the primary caregiver device after initiating contact with the primary caregiver device.

10. The system of claim 9, wherein the controller is further configured to receive the clarification from the primary caregiver device after requesting the clarification.

11. The system of claim 1, wherein the controller is further configured to receive one or more notes from the secondary caregiver.

12. The system of claim 1, wherein the controller is further configured to generate companion media of the companion.

13. The system of claim 12, wherein the secondary caregiver vehicle device includes an in-cabin monitoring system configured to obtain video data forming part of the companion video.

14. The system of claim 12, wherein the secondary caregiver vehicle device includes a microphone configured to obtain audio data forming part of the companion video.

15. A system in a vehicle, comprising:
   a secondary caregiver vehicle device of a secondary caregiver providing care to a companion,
   the secondary caregiver vehicle device including a wireless transceiver in communication with a primary caregiver device of a primary caregiver, and
   the secondary caregiver vehicle device including a controller in communication with the wireless transceiver and configured to:
   store companion biometric data of the companion;
   obtain occupant biometric data of one or more vehicle occupants;
   compare the occupant biometric data with the companion biometric data to determine a companion occupant condition;
   receive a companion profile in response to the companion occupant condition; and
   remove access to the companion profile by the secondary caregiver.

16. The system of claim 15, wherein the controller is further configured to remove access to the companion profile by the secondary caregiver when the primary caregiver device is proximate the secondary caregiver vehicle device.

17. The system of claim 15, wherein the controller is further configured to remove access to the companion profile by the secondary caregiver when the primary caregiver device and the secondary caregiver vehicle device send each other handshake signals.

18. A system in a vehicle, comprising:
   a secondary caregiver vehicle device of a secondary caregiver providing care to a companion,
   the secondary caregiver vehicle device including a wireless transceiver in communication with a primary caregiver device of a primary caregiver, and
   the secondary caregiver vehicle device including a controller in communication with the wireless transceiver and configured to:

obtain occupant biometric data of one or more vehicle occupants;

compare the occupant biometric data with companion biometric data to determine a companion occupant condition; and receive a companion profile in response to the companion occupant condition.

19. The system of claim 18, wherein the primary caregiver device is a primary caregiver vehicle device.

20. The system of claim 18, wherein the primary caregiver device is a primary caregiver user device.

\* \* \* \* \*